United States Patent Office 3,437,196
Patented Apr. 8, 1969

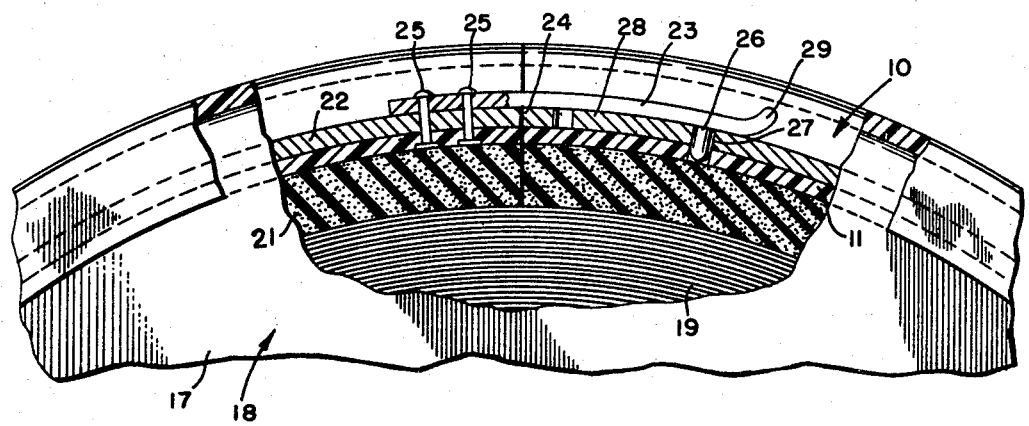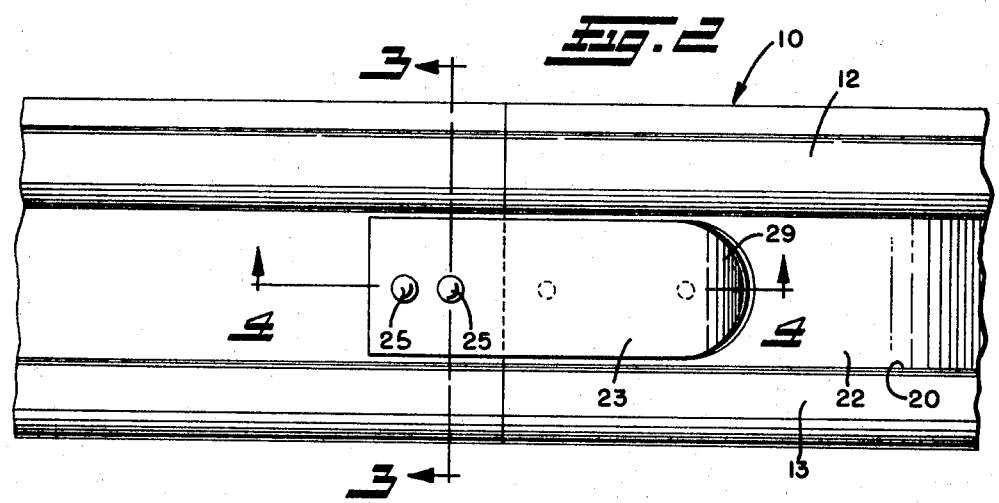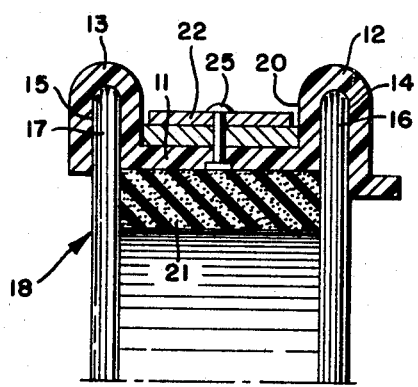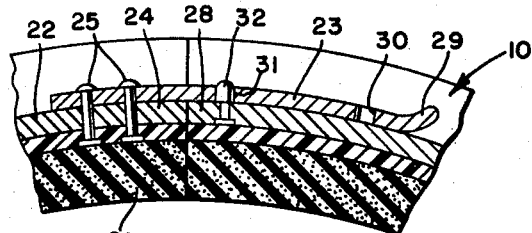
INVENTOR
THOMAS S. KULKA

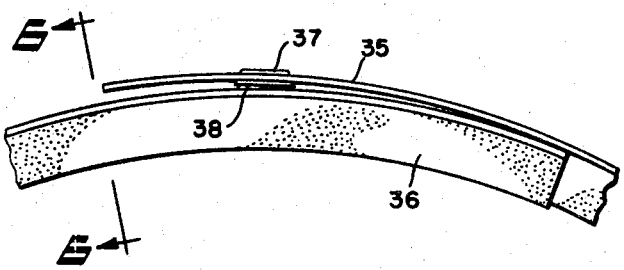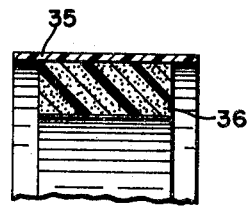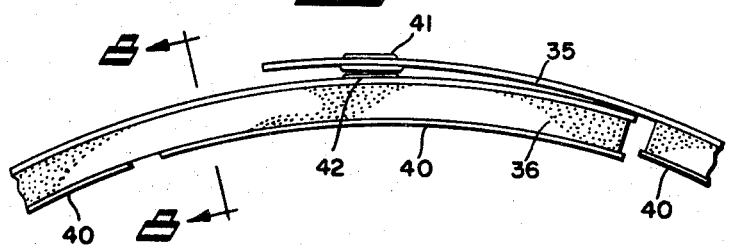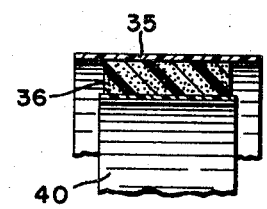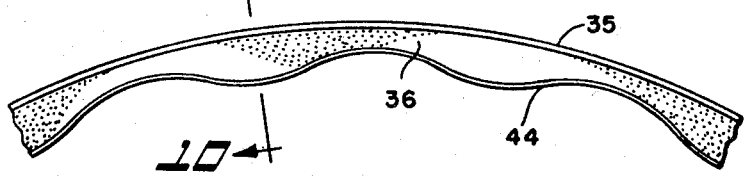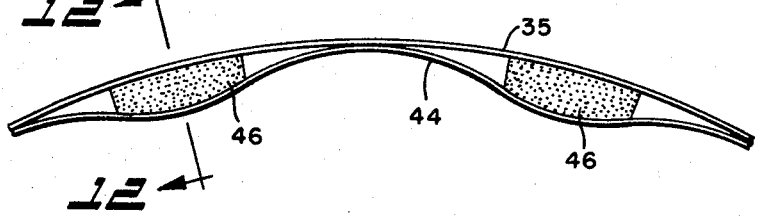

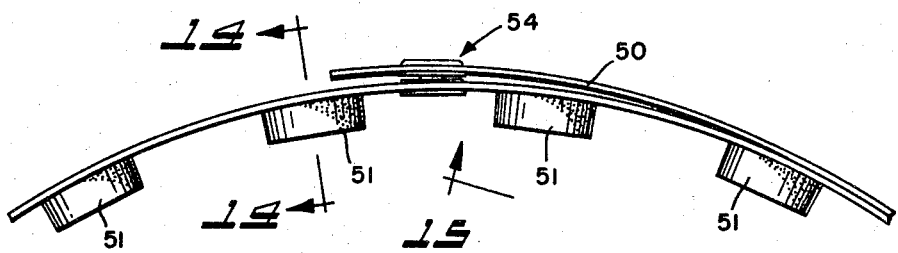
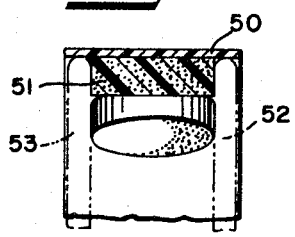
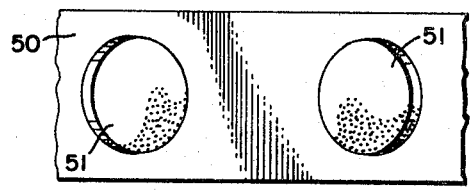
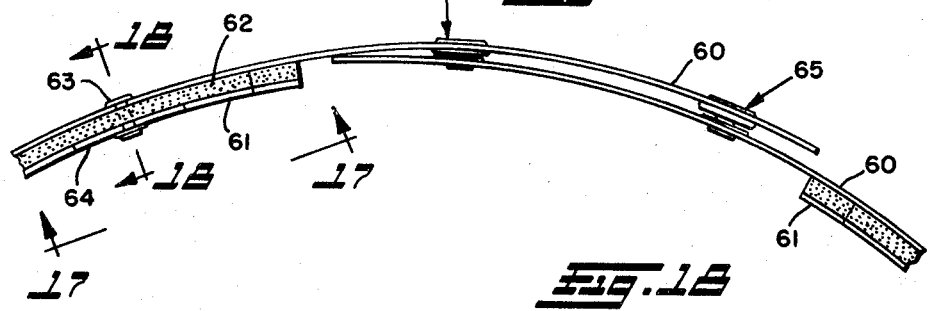
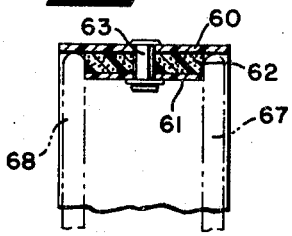
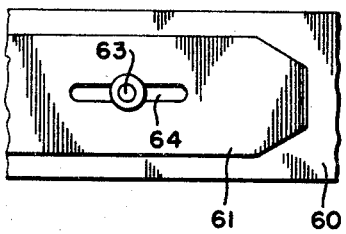

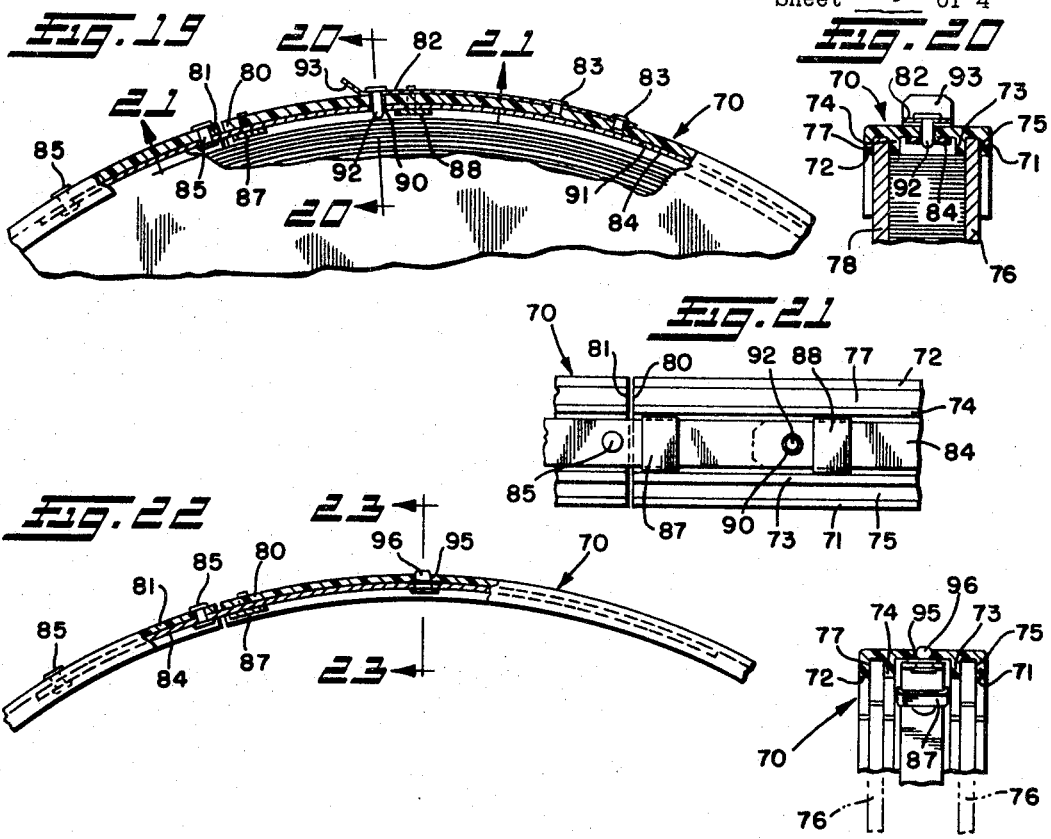

3,437,196
PROTECTIVE REEL BAND
Thomas S. Kulka, 200 Film Bldg., 2108 Payne Ave.,
Cleveland, Ohio 44114
Filed Mar. 17, 1967, Ser. No. 623,917
Int. Cl. B65h 55/00, 15/02; B65d 85/04, 85/66
U.S. Cl. 206—53                                12 Claims

ABSTRACT OF THE DISCLOSURE

A band for protecting the flanges of a tape reel and for closing the space between the flanges thereby protecting the tape wound on the reel. In all of the disclosed band forms, the band is provided with an inner peripheral portion contractible upon application of the band to the reel flanges to snugly fit between the reel flanges to hold the band in place. Most forms of the band are economically constructed of available material, and are retained by conveniently manipulatable latching means.

---

This invention relates as indicated to a protective reel band, and more particularly to a reel band for enclosing the space between the flanges of the reel thereby protecting the tape wound thereon.

With the ever increasing use of tapes of all kinds, for example magnetic tapes, video tapes and film tapes, the storage of such reels poses a substantial problem not only with respect to the storage space required but also to the likelihood of damage to the tape owing to the contamination of the same while in storage by dust or other deleterious material. As a result, reel bands have long been used for protecting the tape, with such bands in a well-known manner extending between the side flanges of the reel thereby enclosing the space radially outwardly from the tape and consequently protecting the same.

While a great variety of reel bands of the indicated type have been used in the past with generally satisfactory results, including those disclosed and claimed in my prior U.S. Patents 2,822,919 and 3,124,243, and disclosed and claimed in my U.S. application Ser. No. 494,791, filed Oct. 11, 1965, now Patent No. 3,311,228, dated Mar. 28, 1967, such bands have commonly been produced by molding or extrusion processes, and, as a result, have been characterized by their relatively high cost.

A primary object of the present invention is to provide a protective reel band which enjoys the functional advantages of present reel bands of this general type but which can be manufactured at substantially reduced cost.

A more specific object of the present invention is to provide in the several forms of the invention reel bands capable of manufacture from lengths of available material thereby avoiding relatively high molding or extruding costs.

A further object of the invention is to provide a reel band of the type described having integral latching means for positively closing the band in position around and between the reel flanges, with such latching means being simply operable for quickly removing the band when it is desired to use the reel.

Yet a further aspect of the present invention is to provide in one band form a construction which is advantageously more rigid when the band is wrapped in place between the reel flanges.

These and other objects of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a fragmentary side-elevational view with certain parts being shown in section of one form of the invention incorporating a strip of resilient cushioning material adapted to engage the outer periphery of the tape and for closing the area between the reel flanges;

FIG. 2 is a top plan view of the reel band of FIG. 1;

FIG. 3 is a sectional view taken on line 3—3 of FIG. 2;

FIG. 4 is a sectional view taken on line 4—4 of FIG. 2;

FIG. 5 is a fragmentary side-elevational view of a modified form of reel band;

FIG. 6 is a sectional view taken on line 6—6 of FIG. 5;

FIG. 7 is a fragmentary side-elevational view of a further form of reel band;

FIG. 8 is a sectional view of the FIG. 7 form of reel band, taken on line 8—8 of FIG. 7;

FIG. 9 is a fragmentary side-elevational view of a further form of reel band;

FIG. 10 is a sectional view of the FIG. 9 form of reel band, taken on line 10—10 of FIG. 9;

FIG. 11 is a fragmentary side-elevational view of yet another form of reel band;

FIG. 12 is a sectional view of the FIG. 11 band, taken on line 12—12 of FIG. 11;

FIG. 13 is a fragmentary side-elevational view of yet another form of reel band in accordance with the invention;

FIG. 14 is a sectional view of the FIG. 13 reel band, taken on line 14—14 of FIG. 13;

FIG. 15 is a view of the FIG. 13 reel band taken in the direction of line 15—15 of FIG. 13;

FIG. 16 is a fragmentary side elevational view of yet another form of reel band;

FIG. 17 is a view of the FIG. 16 band, taken in the direction of line 17—17 of FIG. 16;

FIG. 18 is a sectional view of the FIG. 16 band, taken on line 18—18 of FIG. 16;

FIG. 19 is a fragmentary side elevational view of yet another form of reel band;

FIG. 20 is a sectional view of the FIG. 19 band, taken on line 20—20 of FIG. 19;

FIG. 21 is a view of the FIG. 19 band taken in the direction of line 21—21 of FIG. 19;

FIG. 22 is a fragmentary side elevational view of yet another form of reel band; and, FIG. 23 is a sectional view of the FIG. 22 band taken on line 23—23 of FIG. 22.

Referring now in more detail to the drawings, where like parts are indicated by like refernce numerals and initially to the band form illustrated in FIGS. 1–3, the reel band is generally indicated at 10 and includes a central body portion 11 and generally U-shaped side flanges 12 and 13 which define downwardly opening grooves 14 and 15, respectively, for receiving the flanges 16 and 17 of a reel generally indicated at 18 having tape or film 19 wound thereon. The central body portion 11 and the adjacent side faces of the flanges 12 and 13 of the reel band define a central groove or recess 20 for receiving the latching means as will be presently described.

Secured to the radially inner side of the central body portion 11 by adhesive or other suitable means is a resilient, preferably foam plastic strip 21 adapted to contact the peripheral surface of the tape 19 so as to prevent unwinding of the tape and to provide protection therefor. The cushioning strip 21 moreover preferably laterally extends so as to engage at either side thereof the reel flanges 16 and 17.

A flexible, resilient strap 22 is disposed in the groove 20 and extends arcuately completely around the body portion 11 of the band and is latched therearound so as to bias the flanges 12 and 13 of the band into engagement with the reel flanges 16 and 17. As perhaps best seen in FIG. 1, an arcuate tab 23 is secured both to the strap 22 and to the adjacent end 24 of the body portion 11 by rivets commonly designated at 25. As will be seen, the tab 23 bridges the adjacently disposed ends of the body portion 11, with the free end of the tab being formed with a downwardly projecting stud or the like 26 adapted to be cooperably received in opening 27 provided therefor in the end 28 of the band 22. The tab is provided with an upwardly turned end 29 to facilitate withdrawal of the stud 26 from the aperture 27 when it is desired to remove the band from the reel flanges. It will thus be seen that the stud 26 of the tab is biased downwardly into the aperture 27 thereby to provide a positive latch for retaining the band end on the reel flanges.

The manner in which the reel band shown in FIGS. 1–4 can be applied to the reel flanges should be apparent from the above. The band, with the tab projection 26 removed from the opening 27 formed in the strap 22, is expanded and the same disposed around the reel flanges 16 and 17, with the latter extending into the grooves 14 and 15. The adjacent ends 24 and 28 of the band are then moved toward each other, with the projection 26 and aperture 27 being aligned when such adjacent band ends are abutted, as clearly shown in FIG. 1. The projection 26 is biased into the aperture 27 to retain the band in its closed position on the reel flanges. In such position, the tape 19 is fully protected from dust or other material. To remove the band, the upturned end 29 of the tab 23 is raised thereby disengaging the projection 26 from the aperture 27 and the adjoining ends of the band separated thereby permitting the band to be lifted from the reel flanges.

There is illustrated in FIG. 4 a slightly modified form of latching the band 10 shown in FIGS. 1–3 in operative position on the reel flanges. In this form, the tab 23 is formed with longitudinally spaced apertures 30 and 31, and the end 28 of the band 22 has secured thereto a stud 32 of a length slightly in excess of the thickness of the tab 23. As above described, the tab 23 is biased toward the band 22 whereby the projection 32 snaps into place in either of the openings 30 or 31, with the position thereof as shown in FIG. 4 representing the closed condition of the band, with the projection being received in opening 31, thereby fully protecting the tape. The projection 32 can be disengaged from the aperture 31 and the band expanded simply by raising the upturned end 29 of the tab 23 until the tab 23 in the region of the opening clears the outer end of the projection 32.

In FIG. 5, there is shown a further modified form of reel band comprising a relatively thin strip of hard but flexible material, for example, rigid vinyl, having a width at least as great as the dimension of the outside of the reel flanges and of a length to extend completely around the reel. A strip 36 of preferably soft cushioning material, for example, urethane foam, is secured by adhesive or the like to one side of the thin vinyl strip, with the width of the foam strip 36 being preselected so as to substantially close the entire area between the reel flanges when the band is in place around the reel.

A snap fastener assembly comprising a male member 37 attached to the band 35 adjacent one end thereof and a female member 38 attached to the band 35 adjacent the other end thereof are provided to latch the band in place on the reel flanges. As seen in FIG. 6, and as above noted, the lateral edges of the vinyl strip 35 extend preferably slightly beyond the outer face of the reel flanges, thereby fully protecting the reel against the admittance of dust or the like into the area inwardly of the foam strip 36. It will further be noted as the band is moved to its circular form from its generally flat form which it assumes, for example, when the band is not in use, that the radially inner portion of the foam is compressed, with the foam material inherently accommodating the contraction resulting from such compression. Such contraction would not, of course, be possible with a continuous strip of relatively rigid material.

The manner in which the band illustrated in FIGS. 5–6 is applied should be apparent from the above.

There is shown in FIGS. 7–8 a still further form of reel band generally similar to the form just described and illustrated in FIGS. 5–6. In the FIGS. 7–8 form, arcuate segments of hard vinyl commonly designated at 40 are secured to the radially inner surface of the foam strip 36 by adhesive or the like thereby serving to rigidify the entire band in such radially inner region. As shown in FIG. 8, the vinyl segments 40 extend fully between the reel flanges thereby preventing material from reaching the the region radially outwardly from the tape. The adjacent ends of the successive vinyl strips 40 are spaced to accommodate contraction of the radially inner regions of the foam tape 36 when the band is applied. Snap fastening members 41 and 42 of the type above described are provided for retaining the band in its position over and between the reel flanges.

There is shown in FIGS. 9–10 a still further modified form of reel band in which a continuous inner plastic, strip, for example, rigid vinyl as above described, is adhesively or otherwise secured to the radially inner face of the foam 36. The vinyl strip 44 is substantially coextensive in length with the strip 36 of urethane foam, with the contraction in the radially inner region of the latter when the band is applied causing a buckling of the vinyl strip 44 as clearly seen in FIG. 9. The provision of the continuous inner vinyl strip 44 and the ability thereof to longitudinally buckle owing to the presence of the foam strip 36 serves to strengthen the band, particularly in the transverse dimension thereof.

The band illustrated in FIGS. 9–10 is preferably provided with a snap fastener assembly (not shown) similar to that above described, and is applied to the reel in the same manner.

There is shown in FIGS. 11–12 another form of reel band generally similar to the FIGS. 9–10 form with the exception that the urethane foam is in the form of longitudinally spaced individual foam sections commonly designated at 46. The inner rigid vinyl strip 44 extends in the manner above described fully around the reel and between the reel flanges, with the buckling of the rigid vinyl strip 44 when the band is applied being taken up in the areas between the longitudinally spaced foam sections 46. The advantages of the FIGS. 11–12 form of the invention are that the band is of less weight and employs less material thereby providing a savings in cost. Moreover, in view of the accommodation of the inner vinyl band 44 in the void areas between the foam segments 46, a thicker inner vinyl strip 44 can be employed where transverse strength is an important factor.

In the FIGS. 13–15 form of reel band, a strap 50 of relatively hard flexible material, for example, rigid vinyl, has secured thereto by rivets, adhesive or the like a plurality of longitudinally spaced discs or buttons commonly designated at 51, although the buttons and band could be molded as one unit if desired. As seen in FIG. 14, these buttons are in the form shown plastic and are of a diameter less than the width of the vinyl strip 50 with the reel flanges 52 and 53 shown in dashed lines in this figure being received in the area directly below the lateral edges of the strip 50 and tangent to the peripheries of the several discs 51. For a given reel size, the discs 51 are preferably of a diameter to fit snugly between the reel flanges for frictional retention therebetween.

The reel band illustrated in FIGS. 13–15 can be secured on the reel in any suitable manner, for example, by a snap fastener assembly generally indicated at 54 of the type previously described and illustrated. The reel band illustrated in FIGS. 13–15 is characterized by the ease in which the same can be applied to the reel and by the substantial saving in material and consequent saving in cost derived from such design.

Referring to FIGS. 16–18, a further modified form of the invention is shown therein comprising an outer flexible strip 60 of rigid vinyl or the like, and an inner flexible strip 61 which can be made of the same rigid material. Both the outer and inner rigid strips 60 and 61, respectively, are of one piece construction and are separated throughout by a strip of foam 62 or the like. A plurality of rivets 63, only one of which is visible in these figures, are provided for interconnecting the inner and outer strips, with the inner strip 61 being formed with a longitudinal slot 64 in the region of each of such rivets, excluding the rivet generally opposite the adjoining ends of the band, and extending substantially to either side thereof, as best seen in FIG. 17. Thus, when the band is wrapped from its normally essentially straight position to a position enclosing the reel flanges, relative movement of the inner and outer bands inherently produced during the wrapping operation is effectively accommodated by the slots 64. The rivet midway between the ends of the respective inner and outer strips serves to anchor the inner strip in such region and movement between the inner and outer strips is taken up to either side of such intermediate rivet.

Snap fastener assemblies generally indicated at 65 and 66 are provided on the outer strip 60 which include male and female fastening members of the type described above for retaining the band in position on the reel. As best seen in FIG. 18, the width of the inner vinyl strip 61 and the foam strip 62 secured thereto is less than the width of the outer vinyl strip 60 so as to be snugly received between the reel flanges, shown in dashed lines at 67 and 68 in FIG. 18. The thickness of the foam strip 62 affords a substantial area of contact with the reel flanges to prevent the entrance of dust and the like radially inwardly of the band.

Reference is made to FIGS. 19–21 where there is illustrated a still further form of the invention. In this form, a preferably plastic band generally indicated at 70 is provided which includes, as best seen in FIG. 20, inwardly directed side flanges 71 and 72 and inner flanges 73 and 74 which extend in the same direction. The flanges 71 and 73 define therebetween a groove 75, and the flanges 72 and 74 similarly define a groove 77, with the width of the groove being such as to snugly receive the peripheries of the reel flanges 76.

The opposed free ends 80 and 81 of the band 70 are retained in their abutted position when the band is applied to the reel flanges by fastening means comprising a tab 82, attached by rivets 83 or the like to the band 70, and an inner metallic band 84 of spring steel or the like, attached by rivets 85 to the end portion 81 of the band. Band retaining members 87 and 88 are secured to the end 80 of the band, and, referring to FIG. 1, define with the inner surface of the band openings through which the band 84 freely extends for accommodating movement of the end portion 80 of the band relative thereto.

The inner band 84 is provided with a pair of longitudinally spaced openings 90 and 91 adapted to alternatively receive a downwardly projecting pin or stud 92 carried by the tab 82. The latter is formed with an upturned end portion 93 to facilitate grasping of the tab for moving the pin 92 away from engagement with either opening 90 or 91 to permit movement of the end portion 80 of the band relative to the end portion 81 thereof.

The band 70 is shown in FIG. 19 in place around the reel, with the end portions 80 and 81 of the band being in substantial abutment and latched, with the band thereby effectively preventing the entrance of dust or the like inwardly thereof to the area between the reel flanges and radially outwardly of the tape or film. When it is desired to remove the band 70 for use of the reel, the upturned end 93 of the tab is pulled outwardly thereby removing pin 92 from its latched position in opening 90. The end portions 80 and 81 can thereafter be moved away from each other so as to enlarge the area of the band and permit the band flanges 71, 73 and 72, 74 to be disengaged from the reel flanges 76. The opening 91 in the inner band 84 is longitudinally spaced from the band 90 so as to provide such additional required spacing and the pin 92, when the band ends have been so moved away from each other, is adapted to resiliently snap in the opening 91 to retain the band in its open position.

When it is desired to reposition the band on the reel flanges, the band in its open position is placed around the reel flanges 76 and 78 and the latter disposed between the band flanges 71, 73 and 72, 74, respectively, to the extent that the open position of the band permits. The upturned end 93 of the band 82 is then grasped and the band pulled outwardly to release the pin 92 from the opening 91 of the inner band 84, thereby permitting movement of the end portions 80 and 81 of the band toward each other. When such end portions are in their abutting, FIG. 19, position the pin 92 is aligned with the opening 90 of the inner band 84 and the pin is biased into a latched position in the opening 90.

There is shown in FIGS. 22 and 23 a reel band form generally similar to the form illustrated in FIGS. 19–21, but varying somewhat in the manner in which the adjacent ends of the band 70 are latched in place. In the FIGS. 22–23 form, the inner band 84 carries a pin 95, with the end 80 of the band being formed with an opening 96 for receiving the same. When the ends 80 and 81 of the band are moved toward each other to move the band to a closed position around the reel, the pin 95 resiliently snaps in place in the opening 96 thereby to maintain the reel in such closed position with the extreme end portions of the ends 80 and 81 of the band substantially in abutment. To open the band 70, the pin 95 is depressed to disengage the same from the opening 96 following which the end 80 of the band can be moved away from the opposite end 81 thereof thereby to open the band for releasing the same from the reel flanges. The top of the pin 95, when the band is moved to such open position, will ride along the radially inner surface of the central portion of the band until contact is made with the retaining member 87, with the increased diameter of the band realized before such contact is made being sufficient to permit removal of the band from the reel flanges.

Other modes of applying the principle of the invention may be employed, change being made as regards the details described, provided the features stated in any of the following claims or the equivalent of such be employed.

I therefore particularly point out and distinctly claim as my invention:

1. A one piece protective reel band for closing the space between the flanges of a reel thereby protecting the film or tape wound thereon comprising a body portion of rigid plastic material extending fully circumferentially around the flanges of the reel and being of a width at least as great as the distance between the flanges as measured from the respective outer faces thereof, means separate from said body portion secured thereto and extending radially toward the surface of the tape or film and being of a width to be snugly received between the reel flanges, and retainer means provided separately on the adjacently disposed ends of said rigid body, said retainer means being adapted to be engaged for retaining said band on said reel flanges, or disengaged to free said ends of said body to permit removal of said band from said reel flanges.

2. The band of claim 1 wherein said body portion is formed with generally U-shaped side flanges adapted to receive said reel flanges, resilient strap means disposed fully around said body portion and biasing said side flanges of said reel into engagement with said reel flanges, said means snugly received between said reel flanges comprising foam cushion means secured to the inner surface of said body portion and adapted to extend radially inward into engagement with the periphery of said tape or film for protecting and preventing unwinding of the same, said retainer means comprising a tab attached to said body portion carrying a downwardly extending projection, said resilient strap means being formed with an opening for receiving said projection thereby retaining said band in place on said reel flanges.

3. The band of claim 1 wherein said body portion is formed with generally U-shaped side flanges adapted to receive said reel flanges, resilient strap means disposed fully around said body portion and biasing said side flanges of said reel into engagement with said reel flanges, said means snugly received between said reel flanges comprising foam cushion means secured to the inner surface of said body portion and adapted to extend radially inward into engagement with the periphery of said tape or film for protecting and preventing unwinding of the same, said retainer means comprising a tab attached to said body portion and being formed with at least one opening, projecting means secured to and extending from said resilient strap means and adapted to extend into said opening in said tab when aligned therewith for retaining said band in place on said reel flanges.

4. The band of claim 1 wherein said body portion is formed with generally U-shaped side flanges adapted to receive said reel flanges, said means snugly received between said reel flanges comprising foam cushion means secured to the inner surface of said body portion and adapted to extend radially inward into engagement with the periphery of said tape or film for protecting and preventing unwinding of the same, said retainer means comprising a tab attached to said body portion and carrying a downwardly extending projection adapted to be aligned with an opening formed in said body portion for retaining said band in place on said reel flanges.

5. The reel band of claim 1 wherein said body is formed of rigid vinyl, said means snugly received between said reel flanges comprising a strip of resilient foam material, and male and female snap fastener members secured to the adjacently disposed ends of said vinyl body portion for applying said reel band to said reel flanges.

6. The band of claim 5 further including a plurality of arcuate, spaced vinyl strips secured to the radially inner surface of said resilient foam strip, said arcuate vinyl strips being of generally the same width as said foam strip and serving to rigidify the inner region of said band.

7. The combination of claim 5 further including an inner continuous vinyl strip secured to the radially inner surface of said foam strip, said inner vinyl strip having a width generally equal to the width of said foam strip thereby to fit snugly between said reel flanges, said inner vinyl strip serving to rigidify the inner region of said band.

8. The reel band of claim 1 wherein said body is formed of rigid vinyl, said means snugly received between said reel flanges comprising a plurality of foam strips arcuately spaced around and secured to the inner face of said vinyl strip, the width of said foam strips being such as to fit snugly between said reel flanges, an inner vinyl strip attached to the radially inner surface of said plurality of said foam strips, said inner vinyl strip being of a width generally equally to the width of said foam strips, said inner vinyl strip when said band is applied to said reel flanges buckling into the void areas between said foam strips thereby to form a longitudinally corrugated continuous strip thereby to rigidify said band both longitudinally and transversely.

9. The reel band of claim 1 wherein said body is formed of rigid vinyl, said means snugly received between said reel flanges comprising a series of arcuately spaced discs disposed around the inner surface of said vinyl body, the diameter of said discs being such that the periphery of said discs snugly engage the reel flange thereby to assist retention of said band on said reel flanges.

10. The reel band of claim 1 wherein said body portion is of rigid vinyl material, said means snugly received between said reel flanges comprising a continuous strip of foam material, an inner vinyl strip disposed radially inwardly of said foam material, means operatively interconnecting said vinyl body and said inner vinyl strip for permitting relative movement of the latter relative to the former, said inner vinyl strip being formed with a plurality of elongated slots for receiving said interconnecting means and accommodating relative movement of said inner vinyl strip relative to said body when said band is applied to said reel flange and said inner vinyl strip being approximately the width of said foam strip.

11. A one piece protective reel band for closing the space between the flanges of a reel thereby protecting the film or tape wound thereon comprising a body portion of rigid plastic material extending circumferentially around the flanges of the reel, said body portion being formed with opposed pairs of radially inwardly directed flanges, with each pair of such flanges snugly receiving the flanges of said reel, an arcuate inner band of resilient material secured to said body adjacent one end thereof, guide means mounted on said body at the opposite end thereof for guiding the opposed ends of said body toward or away from each other for closing and opening said band, respectively, and retainer means associated with said band and said body for retaining said body in applied position on said reel flanges, said retainer means comprising a tab secured to said body and provided with a downwardly extending projection, said arcuate band being formed with an opening adapted to be aligned with said projection when the adjacent ends of said body are in abutting relation.

12. A one piece protective reel band for closing the space between the flanges of a reel thereby protecting the film or tape wound thereon comprising a body portion of rigid plastic material extending circumferentially around the flanges of the reel, said body portion being formed with opposed pairs of radially inwardly directed flanges, with each pair of such flanges snugly receiving the flanges of said reel, an arcuate inner band of resilient material secured to said body adjacent one end thereof, guide means mounted on said body at the opposite end thereof for guiding the opposed ends of said body toward or away from each other for closing and opening said band, respectively, and retainer means associated with said band and said body for retaining said body in applied position on said reel flanges, said retainer means comprising a projection affixed to said inner band and adapted to be aligned with an opening formed in said body when the adjacent ends of said body are in abutting relation.

References Cited

UNITED STATES PATENTS 3,251,462    5/1966    Hultgren _____ 206—52
3,343,667    9/1967    Tellen _____ 206—52

WILLIAM T. DIXSON, JR., *Primary Examiner.*